L. Chapman,
Umbrella.
No. 107,000.  Patented Sep. 6, 1870
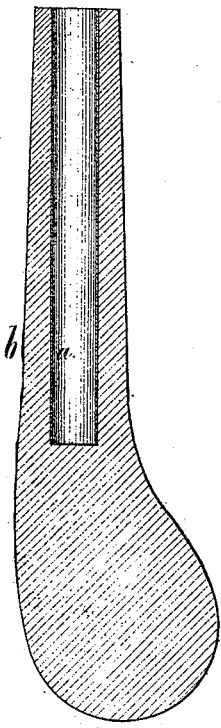
Witnesses
Chas. H. Smith
Geo. D. Walker
Levi Chapman
L. W. Serrell
att'y

United States Patent Office.

LEVI CHAPMAN, OF NEW YORK, N. Y.

Letters Patent No. 107,000, dated September 6, 1870; antedated August 26, 1870.

---

IMPROVEMENT IN MODE OF FORMING UMBRELLA-HANDLES FROM PLASTIC MATERIAL.

---

The Schedule referred to in these Letters Patent and making part of the same.

---

*To all whom it may concern:*

Be it known that I, LEVI CHAPMAN, of the city and State of New York, have invented an Improvement in Handles for Umbrellas, &c.; and the following is hereby declared to be a correct description of the same.

In Letters Patent granted to me May 25, 1869, No. 90,498, a handle is described, in which a plastic composition is pressed around a tubular socket for the cane or stick.

In testing the said invention and making experiments I have discovered that, when a plastic composition, such as before described, is pressed directly upon a wooden stick, rod, or cane, the wood is liable to be injured by the heat and pressure, and either contracts and becomes loose, or expands and renders the handle imperfect, especially where thin material is employed surrounding the wood. Where a metal screw is inserted in the plastic composition, and projects beyond the handle to be screwed into the wood, the wood is liable to be wrenched and broken, besides which the handle, being solid or nearly so, contains a larger amount of the plastic material.

Where there is a hollow socket formed in the handle to receive the stick, cane, or tube of the umbrella or parasol, or where the plastic material is pressed upon the metal of the handle or tube itself, the plastic material is sustained, and there is no more thereof made use of than is required for the particular shape and size of the handle.

My present invention is an improvement upon the mode of manufacturing the said handles, whereby they can be made strong and reliable, but are more easily adapted to the various characters of sticks, canes, tubes, or other articles to which said handles are to be applied.

The object of my present invention is to form a socket in the handle without the use of a rigid metallic tube, so that, if it becomes important to enlarge the tubular socket, the same can be easily bored out, and the handle can be thus easily adapted to metallic or wooden umbrella sticks, canes, or other articles.

In manufacturing handles of the plastic composition, such as shellac and sawdust intimately ground, considerable pressure is employed in molding the mass while in a warm plastic state, and the same has to remain in the mold until sufficiently cool to set or harden. If a metal core is employed to form the socket, the mass adheres to the same so firmly that the core cannot easily be withdrawn.

The nature of my present invention consists in forming a socket in the handle of plastic material, by a core that can be introduced into the mold, and around which the plastic material can be pressed, and then the core can be removed with ease, either partially or entirely, and the socket will be ready for the reception of the stick, cane, or other article.

I make the core of a tube of paper, muslin, or other flexible material, and the same may either be sufficiently stiff and rigid to withstand the pressure of the plastic material, or the tube may be filled with a core of iron or other material that can easily be removed, leaving the paper lining within the handle, and the same may be removed, if desired, by boring out the socket or otherwise.

For a handle for a metallic tube or stick I find that a metal core, greased and wrapped with a piece of paper or tin-foil, will answer the best, as the metal core can be easily removed.

For wooden canes or sticks the lining of paper within the socket is advantageous, as glue will adhere thereto when used to cement in the said wooden cane or stick.

In the drawing I have represented a longitudinal section of the handle—

*a* being the core, formed of a tube of paper or other flexible material, and

*b*, the material pressed in a plastic state around such core.

I claim as my invention—

The handle made of plastic material around a lining of paper or other flexible material, substantially as specified.

Signed this 3d day of January, 1870.

LEVI CHAPMAN.

Witnesses:
CHAS. H. SMITH,
GEO. T. PINCKNEY.